(12) United States Patent
Muramatsu et al.

(10) Patent No.: US 9,379,385 B2
(45) Date of Patent: Jun. 28, 2016

(54) CARBON MATERIAL AND METHOD FOR PRODUCING SAME

(71) Applicant: INCUBATION ALLIANCE, INC., Kobe-Shi, Hyogo (JP)

(72) Inventors: Kazuo Muramatsu, Kobe (JP); Masahiro Toyoda, Kobe (JP)

(73) Assignee: INCUBATION ALLIANCE, INC., Kobe-shi (JP)

( * ) Notice: Subject to any disclaimer, the term of this patent is extended or adjusted under 35 U.S.C. 154(b) by 0 days.

(21) Appl. No.: 14/504,033

(22) Filed: Oct. 1, 2014

(65) Prior Publication Data

US 2015/0024208 A1 Jan. 22, 2015

Related U.S. Application Data

(63) Continuation of application No. 13/266,295, filed as application No. PCT/JP2010/057725 on May 1, 2010, now Pat. No. 8,883,112.

(30) Foreign Application Priority Data

May 6, 2009 (JP) .................................. 2009-112404

(51) Int. Cl.
  *C01B 31/00* (2006.01)
  *H01M 4/587* (2010.01)
  (Continued)

(52) U.S. Cl.
  CPC .............. *H01M 4/587* (2013.01); *C01B 31/00* (2013.01); *C01B 31/04* (2013.01); *C04B 35/52* (2013.01);
  (Continued)

(58) Field of Classification Search
  CPC .................................. C01B 31/00; C01B 31/04
  See application file for complete search history.

(56) References Cited

U.S. PATENT DOCUMENTS

| 5,045,298 A | 9/1991 | Muramatsu et al. |
| 5,744,075 A | 4/1998 | Klett et al. |

(Continued)

FOREIGN PATENT DOCUMENTS

| CN | 1314825 A | 9/2001 |
| CN | 1883068 A | 12/2006 |

(Continued)

OTHER PUBLICATIONS

Katagiri, 'Raman Spectra of Graphite Edge Planes' in Carbon vol. 26 #4 pp. 565-571 (1988).*

(Continued)

*Primary Examiner* — Stuart Hendrickson
(74) *Attorney, Agent, or Firm* — Kratz, Quintos & Hanson, LLP

(57) ABSTRACT

(Problem)
A porous carbon material having excellent graphite crystallinity, good carrier mobility and proper porosity, a porous carbon material having edges of carbon hexagonal planes located on outer surfaces of particle and structure, and flaky graphite being similar to graphene are produced.
(Means to Solve)
By subjecting a carbon material, in which a closed-pore-ratio and an amount of remaining hydrogen in the material are set to be within a proper range, to hot isostatic pressing treatment, a vapor phase growth reaction of graphite is generated in closed pores as nuclei using hydrogen and hydrocarbon generated from the carbon material, thereby producing a large amount of targeted porous carbon material at low cost. Flaky graphite being similar to graphene is produced by applying physical impact to the obtained porous carbon material or by generating a graphite intercalation compound using the porous carbon material as a host and then quickly heating the compound.

1 Claim, 8 Drawing Sheets

(51) Int. Cl.
  *C01B 31/04* (2006.01)
  *C04B 35/52* (2006.01)
  *C04B 35/645* (2006.01)
  *C04B 35/524* (2006.01)
  *C04B 35/626* (2006.01)
  *C04B 38/00* (2006.01)
  *C04B 111/00* (2006.01)

(52) U.S. Cl.
  CPC .............. *C04B 35/522* (2013.01); *C04B 35/524* (2013.01); *C04B 35/6267* (2013.01); *C04B 35/6455* (2013.01); *C04B 38/0022* (2013.01); *C04B 2111/00853* (2013.01); *C04B 2235/6562* (2013.01); *C04B 2235/767* (2013.01); *C04B 2235/77* (2013.01); *Y10T 428/2982* (2015.01)

(56) References Cited

U.S. PATENT DOCUMENTS

| | | | |
|---|---|---|---|
| 5,951,959 A * | 9/1999 | Nishimura | D01F 9/145 264/29.2 |
| 7,094,276 B2 * | 8/2006 | Kojima | B01J 20/02 206/0.7 |
| 2007/0092428 A1 | 4/2007 | Sotowa et al. | |
| 2008/0277284 A1 | 11/2008 | Nesbitt et al. | |

FOREIGN PATENT DOCUMENTS

| | | |
|---|---|---|
| EP | 1243676 A2 | 9/2002 |
| EP | 1246211 A2 | 10/2002 |
| JP | 62-59508 | 3/1987 |
| JP | 62-049363 | 10/1987 |
| JP | 63-218583 | 9/1988 |
| JP | 2-51412 | 2/1990 |
| JP | 2-88461 | 3/1990 |
| JP | 6-212517 | 8/1994 |
| JP | 7-091107 | 10/1995 |
| JP | 2633638 | 4/1997 |
| JP | 2664819 | 6/1997 |
| JP | 3850918 | 9/2006 |
| WO | 03/013822 A1 | 2/2003 |

OTHER PUBLICATIONS

International Search Report for International Application No. PCT/JP2010/057725 dated Oct. 12, 2010.
Michio Inagaki et al.: "Ternary Graphite Intercalation Compounds containing Organic Molecules", Materials Science, Toyohashi University of Technology, Oct. 1986, pp. 196-206.
Extended European Search Report issued Nov. 26, 2012 in counterpart application No. 10772169.8 (5 pages).
Nakamizo, M., et al., "Laser Raman Studies on Carbons," Carbon, vol. 12 (1974), pp. 259-267.
Nakamizo, M., et al., "Raman Spectra of Ground Natural Graphite," Carbon, vol. 16 (1978), pp. 281-283.
Chinese Office action dated May 24, 2013, in the corresponding Chinese application No. 20108001917.9, with English translation-in-part.
Dhami et al., 'Oxidation Behaviour of Pitch Based Carbon Fibers' in Carbon vol. 29 vol. 1 pp. 51-60 (1991).
Inagaki, 'Production of Carbon Spherules and their Carbonization' in Carbon vol. 26 #2 pp. 169-172 1988.
Kavanagh, The Morphology of some Natural and Synthetic Graphites in Carbon vol. 26 #1 pp. 23-32 1988.
Communication pursuant to Article 94(3) EPC in counterpart application 10772169.8.
Summons to attend oral proceedings with EPO Form 2906 dated Feb. 1, 2016, in the corresponding European patent application No. 10772169.8.

* cited by examiner

Crystal structure of carbon (hexagonal graphite)

FIG. 8

Natural graphite, Highly oriented graphite

Surface of carbon hexagonal plane

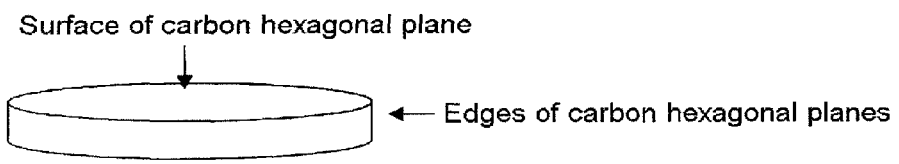

← Edges of carbon hexagonal planes

Carbon fiber, Graphite fiber, Carbon nanotube

Surface of carbon hexagonal plane

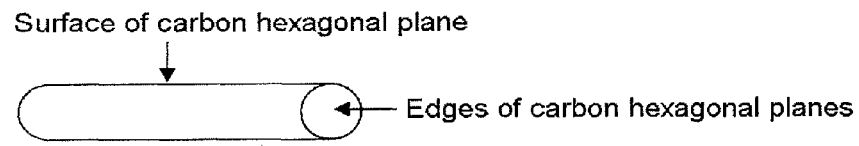

← Edges of carbon hexagonal planes

Artificial graphite, Isotropic graphite

Mixture of surface and edge

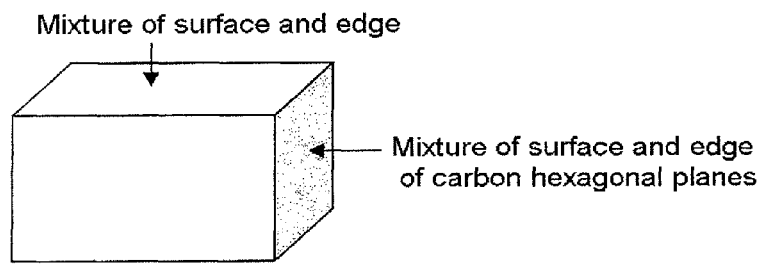

← Mixture of surface and edge of carbon hexagonal planes

The present invention : edges of carbon hexagonal planes are present on the all surface

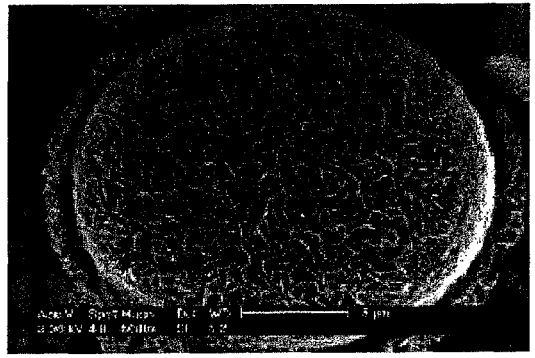

CARBON MATERIAL AND METHOD FOR PRODUCING SAME

TECHNICAL FIELD

The present invention relates to a carbon material which can be suitably used as battery materials for lithium ion batteries, various capacitors and fuel cell electrodes and various catalyst materials.

BACKGROUND ART

Various graphite materials are used on a negative electrode of a lithium ion battery and a negative electrode of an electric double layer capacitor because these materials are suitable for an intercalation reaction with a lithium ion or the like. A compound to which an ion of alkali metal such as lithium or potassium, a sulfate ion or a nitrate ion is inserted between the carbon hexagonal planes (FIG. 1) by intercalation is called a graphite intercalation compound.

In lithium ion batteries and high density capacitors, electric energy is obtained by generation of a graphite intercalation compound as mentioned above, i.e., intercalation and de-intercalation of an intercalate to be inserted between the carbon hexagonal planes, and therefore, graphite materials are used as an electrode material.

In an intercalation reaction between a graphite material and an intercalant (a substance to be inserted), there is an interrelation between the degree of graphitization (crystallinity) of the graphite as a host material and the reactivity. In a donor type graphite intercalation compound where an electron is given to graphite to cause intercalation with a positive ion, reactivity is good in a host material having a high degree of graphitization. Examples of an intercalant for a donor type graphite intercalation compound are alkali metals such as lithium, sodium, potassium and cesium and alkali earth metals such as barium and strontium. (Non-patent Document 1)

These donor type graphite intercalation compounds are generally unstable in the air and react with oxygen and moisture to evacuate (de-intercalation) an intercalant from between the graphite layers. In the case of use of general graphite materials, since a size of a crystallite is as large as several microns and the materials are not complete monocrystals, a part of intercalants stay between the graphite layers to form a so-called residual compound.

In the case of using intercalation for an electrode reaction of lithium ion batteries and capacitors, it is ideal that intercalation and de-intercalation occur reversibly at high speed without forming a residual compound. In order to obtain a high charge/discharge capacity as a battery by such an ideal reaction, it is said to be necessary that a carbon material, such as a graphite material, as a host material has a high degree of graphitization, its crystallite size is fine and its form is porous thereby the area in which a reaction arises being large. (Patent Document 1)

In addition, since an intercalation reaction arises from edges of carbon hexagonal planes, it is desirable that the edges of carbon hexagonal planes are located on an outer surface of the graphite material of a host material. The reaction does not arise on a surface which is parallel to the carbon hexagonal planes. Graphite materials such as naturally produced graphite and Kish graphite precipitated when molten iron is cooled during a process for making iron, said graphite materials are precipitated from a liquid phase under high temperature and high pressure, have a large anisotropy and orientation. Carbon hexagonal planes thereof exist predominantly on the graphite particle surface and location of the edges of carbon hexagonal planes is limited only to edge area of the particle. (FIG. 7)

The carbon fibers obtained from resins such as polyacrylonitrile (PAN) or coal or petroleum pitches are drawn into a fiber and are carbonized and graphitized through the following heat treatment. Therefore, carbon fibers have a structure such that carbon hexagonal planes are oriented concentrically in parallel with each other to the fiber direction or are oriented radially to the same direction. Especially in the case of a structure having carbon hexagonal planes oriented in parallel with each other, the surface of a carbon fiber is occupied predominantly with carbon hexagonal planes. Also in the case of a carbon fiber having a radial structure, carbon hexagonal planes become surface structure for maintaining a fiber structure (the radial structure is formed as if it lies down on the surface portion of the carbon fiber), and is occupied predominantly with carbon hexagonal planes.

There are methods for producing carbon and graphite materials by vapor phase growth using hydrocarbon or hydrogen gas as a starting material and a catalyst such as metal at high temperature. Examples of carbon materials produced by vapor phase growth methods are vapor-phase-grown carbon fiber, carbon nanotube, carbon nanohorn, and fullerene. Any of them are anisotropically grown from a metal catalyst being a starting point of the reaction. Therefore, even in these vapor phase growth methods, carbon hexagonal planes exist predominantly on the outer surface of a material. (Patent Documents 2 and 3)

Example of a method for producing isotropic graphite materials is a method for kneading petroleum coke as a filler with petroleum or coal pitch as a binder and pre-molding, carbonizing and graphitizing the kneaded product using a cold isostatic pressing (CIP) equipment. These isotropic graphite materials have a porosity less than 10%, and crystallinity as a graphite is low because hard carbon for securing a strength are contained in a large amount. (Patent Document 4)

The highly oriented graphite crystal disclosed in JP 2633638 B (Patent Document 5) is a vapor-phase-grown graphite grown in glassy carbon, and is a high density graphite well grown until its bulk density reaches 2.15 or so. Therefore, a ratio of edges of carbon hexagonal planes appearing on the outer surface is relatively low and a porosity calculated from a difference between a bulk density and a true density is as low as several percent, resulting in low reaction efficiency.

PRIOR ART DOCUMENT

Patent Document (Patent Document 1) JP 3850918 B
(Patent Document 2) JP 62-049363 B
(Patent Document 3) JP 2664819 B
(Patent Document 4) JP 7-091107 B
(Patent Document 5) JP 2633638 B

Non-Patent Document (NON-PATENT DOCUMENT 1) Michio Inagaki, Kazuo Muramatsu, Ternary graphite intercalation compounds containing organic molecules, Carbon, Vol. 1986, No. 127 (1986) pp. 196-206, The Carbon Society of Japan.

DISCLOSURE OF INVENTION

Problem to be Solved by the Invention

Conventional graphite materials basically have high anisotropy and are composed of a surface predominantly occupied by carbon hexagonal planes and an edge area predominantly occupied by edges of carbon hexagonal planes. As the degree of graphitization is increased by elevating a heat-treating temperature, anisotropic property tends to increase. Intercalation reaction which is utilized in lithium ion batteries and capacitors arises on the edges of carbon hexagonal planes, and the higher the degree of graphitization (crystallinity) of graphite crystal is, the higher the reaction efficiency is. However, it has been difficult to produce a carbon material in which the whole outer surface of the material is composed of the edges of carbon hexagonal planes.

In addition, it has been difficult to produce a porous material having high porosity since the material is high in density in so far as according to the methods in which a starting carbon material is pre-molded with a cold isostatic pressing (CIP) equipment or a glassy carbon is subjected to hot isostatic pressing to produce a graphite material having high orientation inside thereof.

Means to Solve the Problem

A polymer material to be formed into carbon after heat treatment is molded into a given form and is subjected to baking for carbonization at a specified temperature elevating rate to prepare a pre-baked material having closed pores of a proper extent inside thereof. A baking temperature for carbonization is to be set so as to enable hydrocarbon and hydrogen to be generated in the following step as source materials for vapor-phase-grown graphite. It is essential that the hydrogen-containing carbon material after the baking for carbonization contains hydrogen at a proper concentration and has a suitable number of closed pores becoming a starting point for generation of vapor-phase-grown graphite in the following step.

The above-mentioned carbon material is heat-treated to generate hydrocarbon gas such as methane and hydrogen gas, and, at the same time, high isotropic gas pressure is applied to the carbon material so that these generated gases exist around the material at high concentration. By keeping the carbon material under high temperature and high pressure in the hot isostatic pressing treatment, hydrogen atom is energized to allow CVD reaction with CnHm gas such as methane to proceed, and thereby vapor-phase-grown graphite being precipitated using the above-mentioned closed pores as nuclei.

The above-mentioned production method is characterized in that the porous carbon material having high crystallinity and radially grown carbon hexagonal planes is produced by setting the remaining hydrogen amount and closed-pore-ratio of after baking to be within proper ranges and also setting the ultimate temperature and the pressure at the hot isostatic pressing treatment of after baking to be 1400° C. or more and 10 MPa or more, respectively.

FIGS. 2 and 3 are scanning electron microphotographs of the carbon material produced by the above-mentioned method which microphotographs are used in place of drawings. FIG. 3 is an enlarged photograph of FIG. 2. As it is clear from the figures, porous carbon material having edges of carbon hexagonal planes located on the outer surface thereof is obtained. The thickness of carbon hexagonal planes in the stacking direction calculated from these electron microphotographs is within a range from 0.01 micron to 0.2 micron.

FIG. 4 shows Raman spectrum of the carbon material shown in FIGS. 2 and 3. As it is clear from the figure, there is a strong peak resulting from sp2 hybridized orbital of carbon at 1580 cm$^{-1}$, and the carbon material has a graphite structure having high crystallinity. R value represented by ID/IG (I1360/I1580), which is a peak intensity ratio of a peak around 1580 cm$^{-1}$ that reflects stacking structure to a peak around 1360 cm$^{-1}$ that reflects turbostratic structure, according to spectrum of carbon hexagonal planes by laser Raman spectroscopy, is as extremely low as 0.085, and therefore, the graphite structure is one having high crystallinity of graphite.

In order to further enhance porosity of the porous vapor-phase-grown graphite, it is effective to synthesize a graphite intercalation compound using the carbon material prepared by the above-mentioned method as a host material and subsequently subjecting the compound to quick heating to break connection between the carbon hexagonal planes. Specifically various intercalation compounds such as a binary compound of donor type with alkali metal or alkaline earth metal, a binary compound of acceptor type with sulfuric acid or nitric acid, an organic ternary compound with alkali metal/tetrahydrofuran or alkaline earth metal/tetrahydrofuran, and a multi-element compound with alkali metal/ethers or alkaline earth metal/ethers can be suitably used.

The vapor-phase-grown graphite having high porosity is produced by charging the above-mentioned graphite intercalation compound in an electric oven or the like being held at a temperature of 600° C. or more and quickly heating the compound to break the stacking layers of the carbon hexagonal planes weakly connected by Van der Waals force. When heating the compound more quickly by elevating a quick heating temperature to about 900° C., the porous structure is broken and graphite flakes of 0.001 to 0.01 micron thickness which are similar to graphene can be obtained.

Alternatively, the porous structure is broken by applying to the obtained porous vapor-phase-grown graphite structure physical impact such as application of impact at liquid nitrogen temperature or application of ultrasonic wave in a solvent, and graphite flakes of about 0.01 to 0.1 micron thickness which are similar to graphene can be obtained.

Effect of the Invention

It is possible to produce a porous carbon material in which a ratio of area of carbon hexagonal plane edges to the outer surface of the carbon material is extremely high while conventional graphite materials have large anisotropy and a ratio of area of carbon hexagonal plane edges to the outer surface thereof is low. As a result, mass production of carbon materials for electrode materials and catalyst materials suitable for intercalation reaction, etc. becomes possible at low cost.

By preparing a graphite intercalation compound using a porous carbon material as a host material, in which edges of graphite hexagonal planes are located on the outer surface of the material, and subjecting the compound to quick heating, it is possible to produce a vapor-phase-grown graphite having large porosity and good graphite crystallinity, and to put the carbon material into practical use for electronic devices and the like by making use of characteristics of graphite hexagonal planes having high electron mobility.

BRIEF DESCRIPTION OF DRAWINGS

FIG. 8 is a diagrammatic view illustrating comparison between the conventional carbon material or graphite material and the carbon material of the present invention.

BEST MODE FOR CARRYING OUT THE INVENTION

Figure 1:
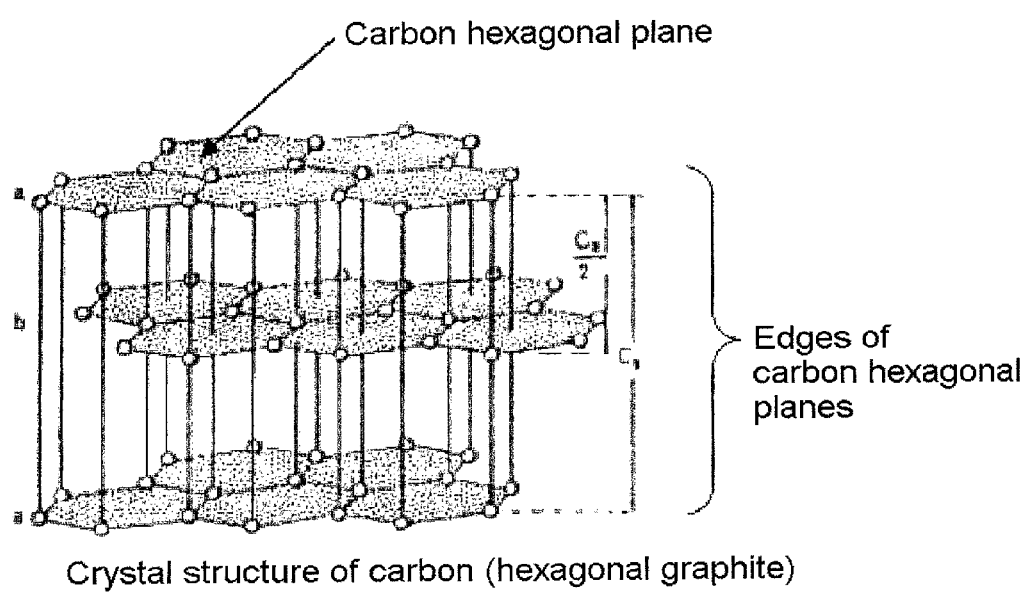
FIG. 1 is a diagrammatic view explaining graphite crystal of carbon.
Figure 2:
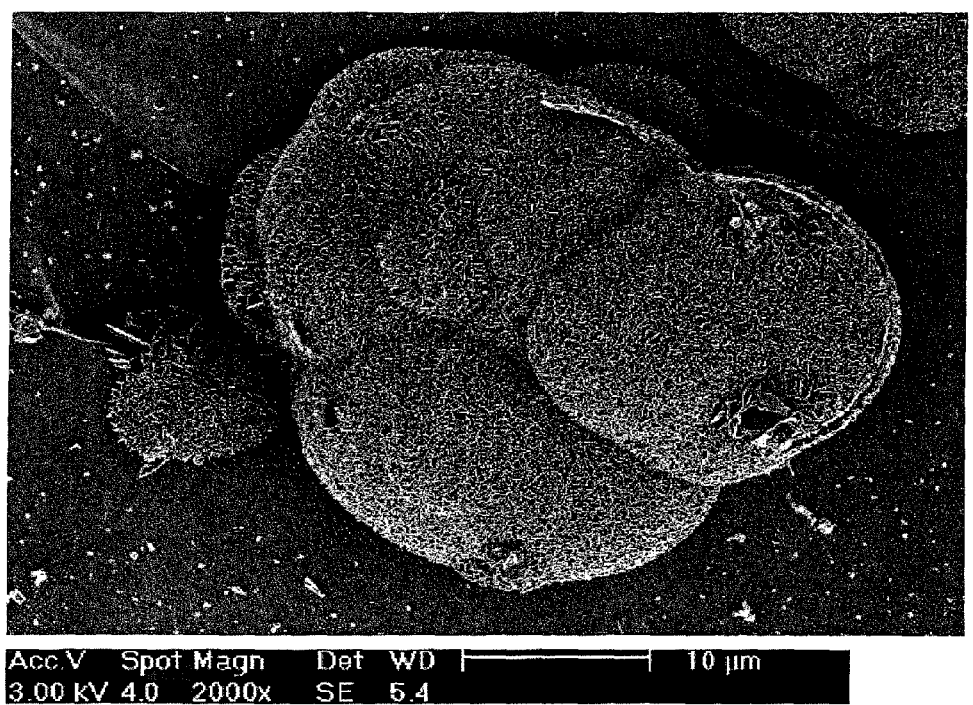
FIG. 2 is a scanning electron microphotograph used in place of a drawing, which shows generated vapor-phase-grown graphite. (Example 4)
Figure 3:
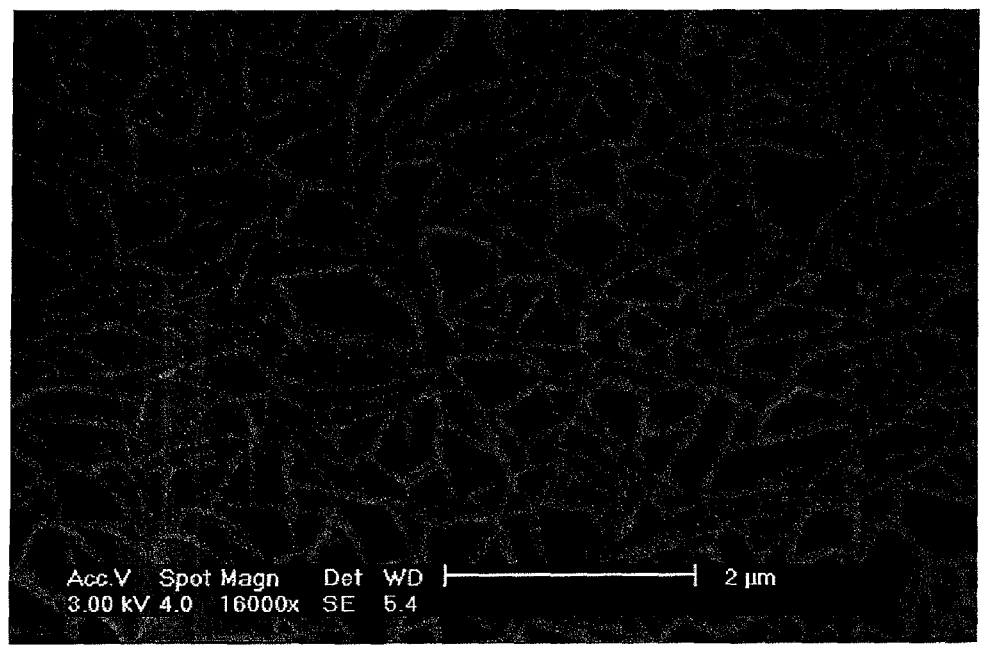
FIG. 3 is a photograph enlarged from FIG. 2 and used in place of a drawing, which shows the porous material in which edges of carbon hexagonal planes are located on the outer surface of the material. (Example 4)
Figure 4:
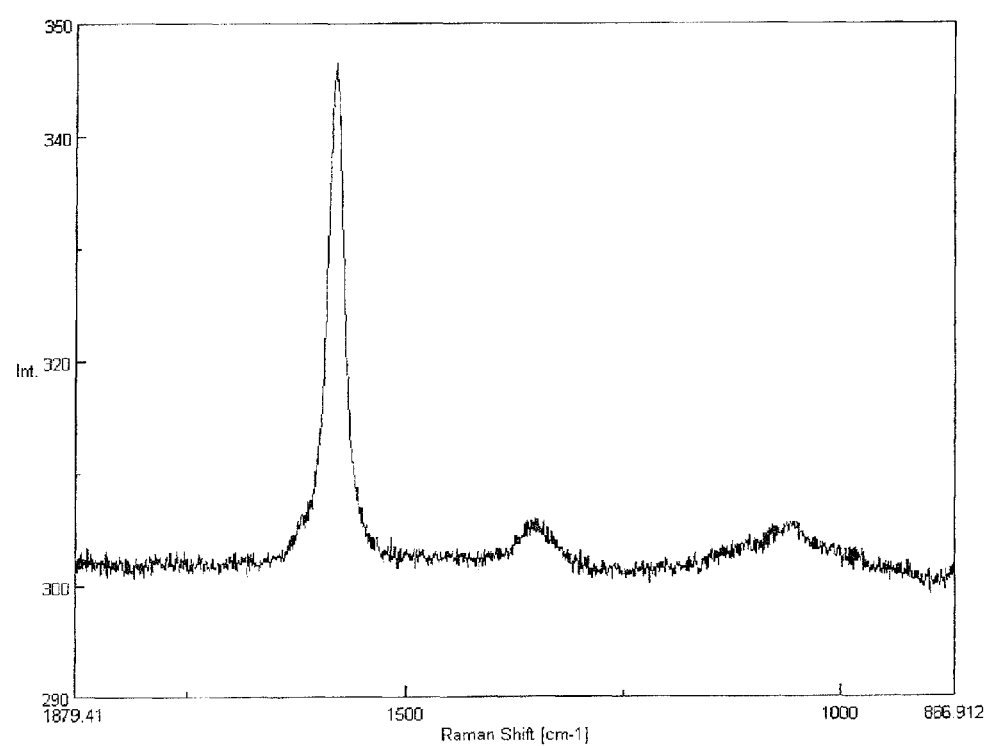
FIG. 4 illustrates Raman spectrum of the generated vapor-phase-grown graphite and indicates that the graphite material has good crystallinity. (Example 4)

A polymer material to be carbonized at high yield after heat treatment is molded into a given form. Examples of such a polymer material which can be suitably used are petroleum pitch, coal pitch, asphalt, PVC pitch, tetrabenzophenazine pitch, naphthalene pitch, anthracene pitch, petroleum mesophase pitch, polyacrylonitrile, rayon, phenol resin, furan resin, cellulose resin and the like.

Further, there can be used natural organic polymers such as starch, cellulose, protein, collagen, alginic acid, dammar, Kovar, rosin, Gutta-percha and natural rubber; semisynthetic polymers such as cellulose resin, cellulose acetate, cellulose nitrate, cellulose acetate butyrate, casein plastic and soybean protein plastic; and synthetic polymers such as thermosetting reins such as phenol resin, urea resin, melamine resin, benzoguanamine resin, epoxy resin, diallyl phthalate resin, unsaturated polyester resin, bisphenol A type epoxy resin, Novolac type epoxy resin, polyfunctional epoxy rein, alicyclic epoxy resin, alkyd resin and urethane resin, thermoplastic resins such as vinyl chloride resin, polyethylene, polypropylene and polystyrene, synthetic rubbers such as polyisoprene and butadiene, synthetic fibers such as nylon, vinylon, acrylic fiber and rayon, and other polymer materials such as polyvinyl acetate, ABS resin, AS resin, acrylic resin, polyacetal, polyimide, polycarbonate, modified polyphenylene ether (PPE), polyethylene terephthalate, polybutylene terephthalate, polyalylate, polysulfone, polyphenylene sulfide, polyether ether ketone, fluororesin, polyamide imide, polyether ether ketone and silicon resin.

A molding method and a shape of a mold are not limited particularly, and any method and shape can be suitably used in the present invention as far as the above-mentioned polymer materials can maintain a given form of a mold. For example, the above-mentioned polymer materials can be formed into a desired shape (for example, disk-like form) by hot press or the like.

The polymer material after molded is baked for carbonization at a given temperature elevating rate in an inert gas atmosphere such as nitrogen gas. The temperature elevating rate is set so that a number of closed pores of several microns to several tens microns are generated inside the material during the baking for carbonization. Specifically the carbonization proceeds while generating closed pores of several microns to several tens microns, by baking for carbonization at a temperature elevating rate of 3° C. or more per hour in the temperature range from room temperature to 500° C. and at a temperature elevating rate of 5° C. or more per hour in the temperature range of 500° C. or more.

It is necessary that an apparent porosity (closed-pore-ratio) calculated from a difference between the true specific gravity and the apparent specific gravity is 2% or more. When the closed-pore-ratio is less than 2%, the number of closed pores which function as nuclei for generating vapor-phase-grown graphite is relatively small, and hydrogen and hydrocarbon of reaction gases get scattered and lost out of the material, thus impairing the vapor phase growth of graphite. A preferable closed-pore-ratio is from about 2% to about 15%, more preferably from about 2.5% to about 15%, further preferably from about 2.5% to about 10%.

During the baking for carbonization of the polymer material, moisture is mainly generated at a temperature around 300° C. At a temperature range of 400° C. or more, water, carbon monoxide, methane, hydrogen and ammonia are generated and thereby elements other than carbon leaving from the material and the carbonization being advanced. In order to allow porous vapor-phase-grown graphite to grow in the following hot isostatic pressing treatment, it is necessary to complete the baking for carbonization in a state of a proper amount of hydrogen being left in the material. Specifically it is preferable to set a baking temperature for carbonization so as to give a remaining hydrogen amount of 0.2 to 5% by weight. The baking temperature for carbonization is usually within a range from about 400° C. to about 1100° C.

In order to generate vapor-phase-grown graphite, it is necessary to satisfy both of the above-mentioned ranges of closed-pore-ratio and remaining hydrogen amount, and even if the closed-pore-ratio is not less than 2%, vapor phase growth of graphite does not occur if the remaining hydrogen amount is smaller.

The material baked for carbonization of which closed-pore-ratio and remaining hydrogen amount have been properly adjusted is charged into a hot isostatic pressing equipment and is subjected to isostatic pressing and heating treatment by using inert gas. In order to obtain porous vapor-phase-grown graphite, it is desirable to conduct the pressing and heating treatment at a temperature of about 1400° C. or more at a pressure of 10 MPa or more. When the temperature is lower than 1400° C., it can be considered that vapor phase growth does not occur since generation of hydrogen carrier and hydrocarbon carrier by excitation of hydrogen is insufficient. When the pressure is lower than 10 MPa, scattering and loss of hydrogen gas and hydrocarbon gas are accelerated, and therefore, it can be considered that reaction gas concentrations and pressures are not reached to a level necessary for vapor phase growth of graphite.

In the present invention, a preferable maximum ultimate temperature at the hot isostatic pressing (HIP) treatment is within a range from about 1400° C. to about 2200° C., more preferably from about 1500° C. to about 2100° C. A preferable maximum ultimate pressure at the HIP treatment is about 10 MPa or more, preferably about 0.50 MPa or more, more preferably about 100 MPa or more, further preferably about 180 MPa or more. An upper limit of the maximum ultimate pressure is not limited particularly, but in the case of using a HIP equipment, usually the upper limit is determined of itself by performance of the equipment. Such an upper limit is self-explanatory for a person skilled in the art, and is usually about 200 MPa and, in the case of especially high performance equipment, about 300 MPa. A preferable range of pressure can be properly selected from the above-mentioned range.

In the isostatic pressing and heating treatment, vapor-phase-grown graphite can be produced efficiently by conducting the treatment in a pressure-preceding treatment pattern such that a pressure is elevated to 50 MPa or more in advance of reaching of temperature to a pre-baking temperature for carbonization of the material and then subsequently heating to a given maximum ultimate temperature. When the maximum ultimate pressure in the HIP treatment is lower than 50 MPa, it is recommendable to elevate to the maximum ultimate pressure in advance of reaching of temperature to a pre-baking temperature for carbonization of the material and then subsequently heating to a given maximum ultimate temperature.

The carbon material of the present invention is useful because it is porous, and especially one having a total porosity of 40% or more, more preferably one having a total porosity of 60% or more, further preferably one having a total porosity of 70% or more is preferable. In addition, the carbon material of the present invention is useful because it has high graphite crystallinity, and especially one having the above-mentioned R value (ID/IG (I1360/I1580)) of less than 0.2 obtained by a laser Raman spectroscopy is preferable.

Herein the amount of hydrogen is one measured by an inert gas fusion method. Here, the inert gas fusion method is a method for measuring by heating a sample by high frequency heating, transferring generated hydrogen gas with inert gas and determining the amount of hydrogen with a thermal conductivity detector. The measuring device used is EMGA621 produced by Horiba, Ltd.

The closed-pore-ratio (apparent porosity) is calculated by (True density−Apparent density)÷True density×100(%) and is an index showing a ratio of closed pores existing in a sample to a volume of the sample.

The total porosity is calculated by (True density−Bulk density)÷True density×100(%) and is an index showing a ratio of the whole pores of a sample, namely a ratio of the both of closed pores being a closed cavity inside the sample and open pores being a cavity on uneven portions of the sample surface to the volume of the sample.

Here, the true density is a density (mass per unit volume) measured using a sample crushed into fine powders in order to minimize an effect of cavities (including open pores and closed pores) of the sample. In the Examples of the present invention, the true density is obtained by using a powder sample passed through a 74 μm filter and dividing a volume measured by a liquid immersion picnometer method by the sample weight. Crushing the sample into fine powders is an operation for removing closed pores such as air bubbles contained in the original sample. The liquid immersion picnometer method is a method for putting a powder sample together with a dispersing medium such as butanol into a measuring cell, and carrying out deaeration for invasion of the liquid in cavities of the sample, thus measuring a volume of the sample without including the cavities. In the Examples of the present invention, the volume was measured with a densimeter AUTO TRUE DENSER MAT-500 manufactured by SEISHIN ENTERPRISE CO., LTD. Herein, a value obtained by dividing a sample weight by the thus obtained volume is defined as a true density.

The apparent density is a value obtained by dividing a sample weight by a volume obtained by excluding the volume of open pores but not the volume of closed pores contained in the sample. Such a volume is measured by the liquid immersion picnometer method in the same manner as in the above-mentioned measurement of the true density except that a sample not crushed is used.

The bulk density is a value obtained by dividing a sample weight by a volume calculated from the outer dimensions of the sample. Since the volume calculated from the outer dimensions of the sample is used, the obtained volume includes the volumes of not only closed pores but also open pores (generally micropores) in addition to the volume of the sample itself. On the other hand, the volume to be used for calculating an apparent density is one containing closed pores but not open pores. Therefore, usually an apparent density is larger than a bulk density.

A bulk density is synonymous with a bulk specific gravity, and a true density and an apparent density are synonymous with a true specific gravity and an apparent specific gravity, respectively.

The R value by the laser Raman spectroscopy is a ratio of a peak intensity around 1580 cm$^{-1}$ (represented by IG or I1580) showing a stacking structure of carbon hexagonal planes to a peak intensity around 1360 cm$^{-1}$ (represented by ID or I1360) showing a turbostratic structure, namely a value represented by ID/IG (I1360/I1580).

Example 1

A phenol-formaldehyde resin was molded into a form having an outer diameter of 100 mm and a thickness of 5 mm with a hot press. The resin molded article after the molding was subjected to baking for carbonization up to a temperature of 950° C. under nitrogen gas atmosphere. The sample after the baking for carbonization was heated at 110° C. for two hours and an amount of remaining hydrogen was measured by inert gas fusion method. The amount of hydrogen remaining in the sample was 0.8% by weight. The apparent porosity (closed-pore-ratio) calculated from the apparent density measured by a liquid immersion method and the true specific gravity measured by the liquid immersion method after crushing of the sample was 7%. The baking for carbonization was carried out at a temperature elevating rate of 20° C. per hour in the temperature range from room temperature to 200° C., at a temperature elevating rate of 5° C. per hour in the temperature range from 200° C. to 500° C., at a temperature elevating rate of 8° C. per hour in the temperature range from 500° C. to 700° C., and at a temperature elevating rate of 10° C. per hour in the temperature range from 700° C. to the maximum ultimate temperature.

Example 2

The sample prepared in Example 1 was charged in a hot isostatic pressing equipment and was subjected to isostatic pressing and heating treatment at a maximum ultimate temperature of 1200° C. at an maximum ultimate pressure of 150 MPa using argon gas. The material after the treatment was broken and the broken surface was observed. Vapor-phase-grown graphite was not generated.

Example 3

The sample prepared in Example 1 was charged in a hot isostatic pressing equipment and was subjected to isostatic pressing and heating treatment at a maximum ultimate temperature of 1500° C. at a maximum ultimate pressure of 150 MPa using argon gas. The material after the treatment was broken and the broken surface was observed. Vapor-phase-grown graphite was generated slightly. Yield of the vapor-phase-grown graphite (a volume ratio of the vapor-phase-grown graphite in the material) was 3%.

Example 4

The sample prepared in Example 1 was charged in a hot isostatic pressing equipment and was subjected to isostatic pressing and heating treatment at a maximum ultimate temperature of 2000° C. at a maximum ultimate pressure of 150 MPa using argon gas. The material after the treatment was broken and a large amount of vapor-phase-grown graphite was found to have been generated inside the material. Yield of the vapor-phase-grown graphite (a volume ratio of the vapor-phase-grown graphite in the material) was 70%. The bulk density of the obtained vapor-phase-grown graphite was 0.3, its true density was 2.1, and its total porosity calculated from the difference between the bulk density and the true density was 86%.

Example 5

A phenol-formaldehyde resin was molded into a form having an outer diameter of 100 mm and a thickness of 5 mm with a hot press. The resin molded article after the molding was subjected to baking for carbonization up to a temperature of 1100° C. under nitrogen gas atmosphere. The sample after the baking for carbonization was heated at 110° C. for two hours and an amount of remaining hydrogen was measured by an inert gas fusion method. The amount of hydrogen remaining in the sample was 0.2% by weight. The apparent porosity (closed-pore-ratio) calculated from the apparent density measured by a liquid immersion method and the true specific gravity measured by the liquid immersion method after crushing of the sample was 4%. The baking for carbonization was carried out at a temperature elevating rate of 20° C. per hour in the temperature range from room temperature to 200° C., at a temperature elevating rate of 5° C. per hour in the temperature range from 200° C. to 500° C., at a temperature elevating rate of 8° C. per hour in the temperature range from 500° C. to 700° C., and at a temperature elevating rate of 10° C. per hour in the temperature range from 700° C. to the maximum ultimate temperature.

Example 6

The sample prepared in Example 5 was charged in a hot isostatic pressing equipment and was subjected to isostatic pressing and heating treatment at a maximum ultimate temperature of 2000° C. at a maximum ultimate pressure of 190 MPa using argon gas. The material after the treatment was broken and the vapor-phase-grown graphite was found to have been generated inside the material. Yield of the vapor-phase-grown graphite (a volume ratio of the vapor-phase-grown graphite in the material) was 50%. The bulk density of the obtained vapor-phase-grown graphite was 0.7, its true density was 2.1, and its total porosity calculated from a difference between the bulk density and the true density was 67%.

Example 7

A phenol-formaldehyde resin was molded into a form having an outer diameter of 100 mm and a thickness of 5 mm with a hot press. The resin molded article after the molding was subjected to baking for carbonization up to a temperature of 1200° C. under nitrogen gas atmosphere. The sample after the baking for carbonization was heated at 110° C. for two hours and an amount of remaining hydrogen was measured by an inert gas fusion method. The amount of hydrogen remaining in the sample was 0.05% by weight. The apparent porosity (closed-pore-ratio) calculated from the apparent density measured by a liquid immersion method and the true specific gravity measured by the liquid immersion method after crushing of the sample was 2%. The baking for carbonization was carried out at a temperature elevating rate of 20° C. per hour in the temperature range from room temperature to 200° C., at a temperature elevating rate of 5° C. per hour in the temperature range from 200° C. to 500° C., at a temperature elevating rate of 8° C. per hour in the temperature range from 500° C. to 700° C., and at a temperature elevating rate of 10° C. per hour in the temperature range from 700° C. to the maximum ultimate temperature.

Example 8

The sample prepared in Example 7 was charged in a hot isostatic pressing equipment and was subjected to isostatic pressing and heating treatment at a maximum ultimate temperature of 2000° C. at a maximum ultimate pressure of 190 MPa using argon gas. The material after the treatment was broken and the vapor-phase-grown graphite was found not to have been generated.

Example 9

A phenol formaldehyde resin was molded into a form having an outer diameter of 100 mm and a thickness of 5 mm with a hot press. The resin molded article after the molding was baked for carbonization up to a temperature of 450° C. in nitrogen gas atmosphere. The sample after the baking for carbonization was heated at 110° C. for two hours, and the amount of remaining hydrogen measured by an inert gas fusion method was 5% by weight. The apparent porosity (closed-pore-ratio) calculated from the apparent density measured by a liquid immersion method and the true specific gravity measured by a liquid immersion method was 3%. The baking for carbonization was carried out at a temperature elevating rate of 20° C. per hour in the temperature range from room temperature to 200° C., and at a temperature elevating rate of 5° C. per hour in the temperature range from 200° C. to a maximum ultimate temperature.

Example 10

The sample prepared in Example 9 was charged in a hot isostatic pressing equipment and was subjected to isostatic pressing and heating treatment at a maximum ultimate temperature of 2000° C. at a maximum ultimate pressure of 190 MPa using argon gas. The material after the treatment was burst into pieces and a large amount of vapor-phase-grown graphite was found to have been generated around the pieces. Yield of the vapor-phase-grown graphite (a volume ratio of the vapor-phase-grown graphite in the material) was 60%.

Example 11

Each of the samples prepared in Example 1 and Example 5 was charged in a hot isostatic pressing equipment and was subjected to isostatic pressing and heating treatment at a maximum ultimate temperature of 2000° C. at a maximum ultimate pressure of 10 MPa using argon gas. The material after the treatment was broken and the broken surface was observed. Vapor-phase-grown graphite was generated slightly. Yield of the vapor-phase-grown graphite (a volume ratio of the vapor-phase-grown graphite in the material) was 10% each.

Example 12

Each of the samples prepared in Example 1 and Example 5 was charged in a hot isostatic pressing equipment and was subjected to isostatic pressing and heating treatment at a maximum ultimate temperature of 2000° C. at a maximum ultimate pressure of 1 MPa using argon gas. The material after the treatment was broken and the broken surface was observed but vapor-phase-grown graphite was not generated.

Example 13

The sample prepared in Example 4 was immersed in an aqueous solution mixture of sulfuric acid and nitric acid to prepare a first stage graphite—sulfuric acid intercalation compound. The obtained graphite intercalation compound was washed with water and poured into a crucible heated to 600° C., followed by quick heating of the compound. By the quick heating, the sample was exfoliated into a twice volume, and a graphite material having a bulk density of 0.15 was obtained.

Example 14

The sample prepared in Example 4 was immersed in an aqueous solution mixture of sulfuric acid and nitric acid to prepare a first stage graphite-sulfuric acid intercalation compound. The obtained intercalation compound was washed with water and poured into a crucible heated to 900° C., followed by quick heating of the compound. By the quick heating, the graphite intercalation compound was burst, and flaky graphite being similar to graphene and having a thickness of 0.001 to 0.01 micron was obtained.

Example 15

The sample prepared in Example 4 was cooled with liquid nitrogen and then crushed with a metal hammer. By the crushing, the porous structure was broken and flaky graphite being similar to graphene and having a thickness of 0.01 to 0.1 micron was obtained.

Example 16

Figure 6:
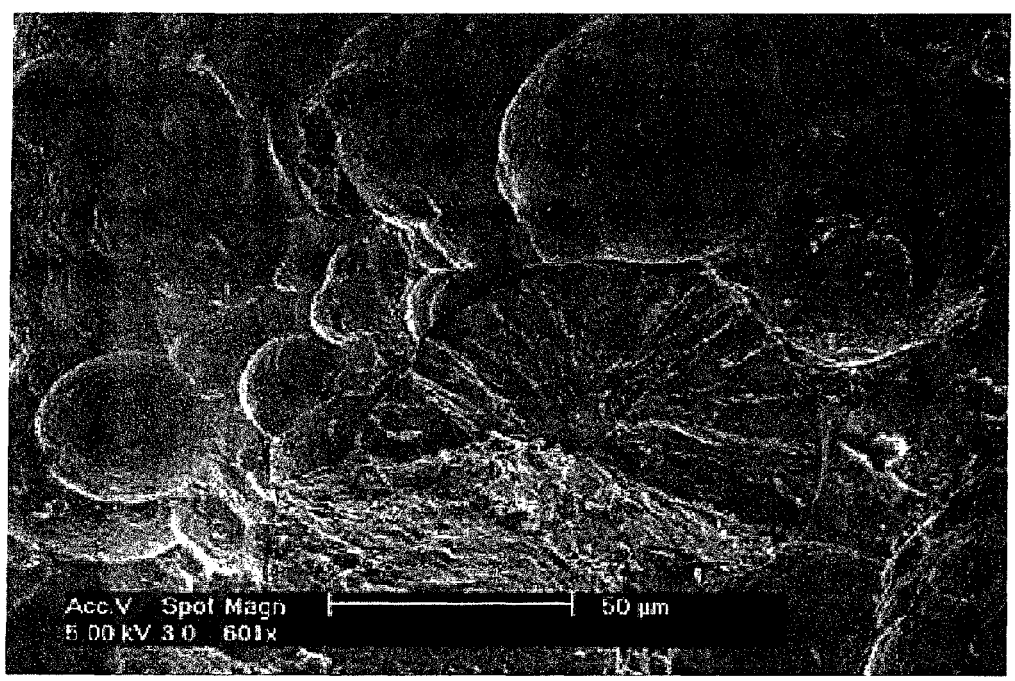
FIG. 6 is a photograph of a graphite surface having a dense structure but not a porous structure, taken with a scanning electron microscope (SEM). (Example 16)
Figure 7:
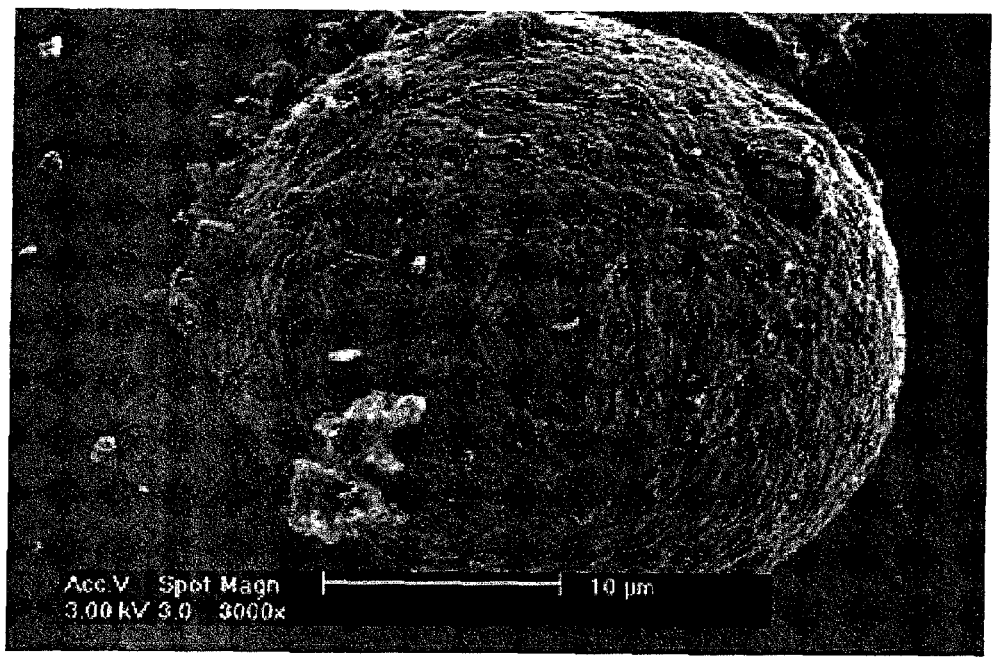
FIG. 7 is a photograph of a graphite surface having a dense structure but not a porous structure, taken with a high magnification SEM. (Example 16)

The sample prepared in Example 1 was charged in a hot isostatic pressing equipment and was subjected to isostatic pressing and heating treatment at a maximum ultimate temperature of 2500° C. at a maximum ultimate pressure of 150 MPa using argon gas. The treated material was broken, and generation of a large amount of graphite was found inside the material. However, the graphite was not porous one and existence of graphite crystal edges was not observed on the graphite surface. Yield of the vapor-phase-grown graphite (a volume ratio of the vapor-phase-grown graphite in the material) was 80%. The bulk density of the obtained vapor-phase-grown graphite was 1.90, the true density thereof was 1.96, and the total porosity calculated from a difference between the bulk density and the true density was 3%. SEM photographs of the surface of the obtained graphite are shown in FIG. 6 and FIG. 7.

Comparison of the structure of carbon hexagonal planes between the conventional carbon material or graphite material and the porous carbon material of the present invention is shown in FIG. 8. Natural graphite, highly oriented graphite, HOPG and kish graphite have high graphite crystallinity, and therefore, have a high anisotropic structure. As shown in the figure, the edges of carbon hexagonal planes of such graphite are concentrated on edge area of the particles and the structures, and the surfaces of carbon hexagonal planes exist predominantly on the surface. This is because the graphitization (crystallization) generally proceeds, depending on a pressing direction, to generate stacking of carbon hexagonal planes.

Also, conventional carbon fiber, graphite fiber and carbon nanotube have a structure having high anisotropy, and as shown in FIG. 8, in many cases, edges of carbon hexagonal planes are located only at the ends of fibers. In the cases of isotropic graphite and general artificial graphite, as shown in FIG. 8, the surfaces and edges of carbon hexagonal planes are present as a mixture in every direction.

Figure 5:
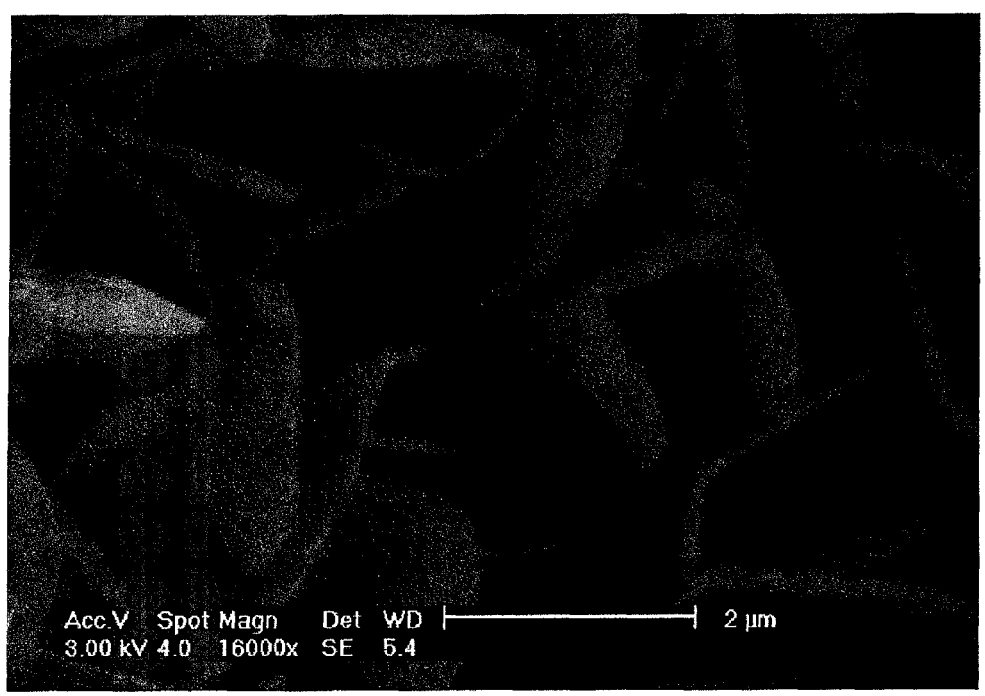
FIG. 5 is a photograph used in place of a drawing which is a scanning electron microphotograph of graphite flakes having a similar structure as that of graphene and obtained by breaking the porous graphite structure. (Example 14)

The carbon material comprising the porous vapor-phase-grown graphite obtained in the present invention is one having a novel structure being different from those of conventional carbon materials and graphite materials as shown in FIG. 8. By preparing a graphite intercalation compound using this porous graphite structure as a host material and then quickly heating the compound or breaking the porous graphite structure of the compound, extremely thin flaky graphite having a structure being similar to graphene can be obtained as shown in FIG. 5.

The treatment conditions and characteristics of products in Examples 1 to 12 and 16 of the present invention are collectively shown in Table 1.

TABLE 1

| | Conditions of baking for carbonization of starting material | | | Isostatic pressing and heating treatment conditions | | | |
|---|---|---|---|---|---|---|---|
| Example | Temp. (° C.) | Remaining hydrogen amount wt % | Closed-pore-ratio (%) | Starting material for baking for carbonization | Temp. (° C.) | Pressure (MPa) | Generation of graphite |
| 1 | 950 | 0.8 | 7 | — | — | — | — |
| 2 | 950 | 0.8 | 7 | Example 1 | 1200 | 150 | not found |
| 3 | 950 | 0.8 | 7 | Example 1 | 1500 | 150 | generated |
| 4 | 950 | 0.8 | 7 | Example 1 | 2000 | 150 | generated |
| 5 | 1100 | 0.2 | 4 | — | — | — | — |
| 6 | 1100 | 0.2 | 4 | Example 5 | 2000 | 190 | generated |
| 7 | 1200 | 0.05 | 2 | — | — | — | — |
| 8 | 1200 | 0.05 | 2 | Example 7 | 2000 | 190 | not found |
| 9 | 450 | 5 | 3 | — | — | — | — |
| 10 | 450 | 5 | 3 | Example 9 | 2000 | 190 | generated |
| 11 | 950 | 0.8 | 7 | Example 1 | 2000 | 10 | generated |
| | 1100 | 0.2 | 4 | Example 5 | 2000 | 10 | generated |
| 12 | 950 | 0.8 | 7 | Example 1 | 2000 | 1 | not found |
| | 1100 | 0.2 | 4 | Example 5 | 2000 | 1 | not found |
| 16 | 950 | 0.8 | 7 | Example 1 | 2500 | 150 | generated |

TABLE 1-continued

Characteristics of generated carbon materials

| Example | Volume ratio (%) | Bulk density | True density | Total porosity (%) | Form |
|---|---|---|---|---|---|
| 1 | — | — | — | — | |
| 2 | — | — | — | — | |
| 3 | 3 | — | — | — | |
| 4 | 70 | 0.3 | 2.1 | 86 | porous |
| 5 | — | — | — | — | |
| 6 | 50 | 0.7 | 2.1 | 67 | porous |
| 7 | — | — | — | — | |
| 8 | — | — | — | — | |
| 9 | — | — | — | — | |
| 10 | 60 | — | — | — | porous |
| 11 | 10 | — | — | — | porous |
| | 10 | — | — | — | porous |
| 12 | — | — | — | — | |
| 16 | 80 | 1.9 | 1.96 | 3 | dense |

Note)
In any Examples, a phenol-formaldehyde resin was molded into a form having an outer diameter of 100 mm and a thickness of 5 mm with a hot press and used as a starting material.

INDUSTRIAL APPLICABILITY

The carbon material of the present invention is a porous material having excellent graphite crystallinity, in which edges of carbon hexagonal planes are located on its outer surface, and can be suitably used as electrode materials of lithium ion batteries, capacitors, etc., platinum-carrying electrodes of fuel cells, electrodes of various primary batteries and secondary batteries, and the like making use of intercalation reactivity with graphite. In addition, according to the present invention, mass production of the above-mentioned novel material is possible at low cost. Further, treatment for expanding and breaking the obtained porous carbon material makes it possible to produce flaky graphite being similar to graphene and realizes application thereof to electronic devices (such as a film having high electric conductivity and thermal conductivity, a touch panel using the film, an electrode for flat display, an electrode sheet for solar cell, etc.) making use of high carrier mobility of carbon hexagonal planes.

The invention claimed is:

1. A vapor-phase-grown porous carbon material comprising edges of carbon hexagonal planes on an outer surface thereof, having a total porosity of 40% or more, and having an R value (a peak intensity ratio represented by I1360/I1580) measured by a laser Raman spectroscopy of less than 0.2,
wherein the carbon material has a structure having a portion comprising a spherical form or an elliptical form,
wherein substantially whole outer surface of the carbon material is composed of edges of carbon hexagonal planes,
wherein the carbon hexagonal planes are vapor-phase-grown radially and are stacked, and thicknesses of the carbon hexagonal planes in the stacking direction are within the range of 0.001 to 0.2 microns.

* * * * *